(12) United States Patent     (10) Patent No.: US 12,672,102 B2

Fan     (45) Date of Patent: Jun. 30, 2026

(54) WIRELESS COMMUNICATION METHOD FOR PAGING PROCESS, AND DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 252 days.

(21) Appl. No.: 18/224,838

(22) Filed: Jul. 21, 2023

(65) Prior Publication Data

US 2023/0362885 A1    Nov. 9, 2023

Related U.S. Application Data

(63) Continuation of application No. PCT/CN2021/074468, filed on Jan. 29, 2021.

(51) Int. Cl.
    *H04W 68/02*      (2009.01)
    *H04W 68/00*      (2009.01)
    *H04W 76/19*      (2018.01)

(52) U.S. Cl.
    CPC ................................... *H04W 68/02* (2013.01)

(58) Field of Classification Search
    CPC ...................................................... H04W 68/02
    USPC ......................................................... 455/458
    See application file for complete search history.

(56) References Cited

U.S. PATENT DOCUMENTS

| | | | | |
|---|---|---|---|---|
| 2007/0259675 | A1* | 11/2007 | Worrall | H04W 68/00 |
| | | | | 455/458 |
| 2011/0171929 | A1* | 7/2011 | Tamura | H04W 48/12 |
| | | | | 455/404.1 |
| 2011/0235605 | A1* | 9/2011 | Yeoum | H04W 72/04 |
| | | | | 370/328 |
| 2012/0208570 | A1* | 8/2012 | Park | H04W 76/38 |
| | | | | 455/466 |
| 2020/0022104 | A1 | 1/2020 | Geng et al. | |
| 2020/0187152 | A1* | 6/2020 | Karampatsis | H04W 4/06 |
| 2020/0305118 | A1 | 9/2020 | Ryu et al. | |
| 2021/0099921 | A1* | 4/2021 | Han | H04W 68/02 |
| 2021/0352619 | A1* | 11/2021 | Ryu | H04W 68/005 |
| 2022/0132464 | A1* | 4/2022 | Agiwal | H04W 68/02 |

(Continued)

FOREIGN PATENT DOCUMENTS

| | | |
|---|---|---|
| CN | 101043710 A | 9/2007 |
| CN | 109413737 A | 3/2019 |
| CN | 109417773 A | 3/2019 |

(Continued)

OTHER PUBLICATIONS

Office Action issued by the China Patent Office for Application No. CN202311316969.5 mailed on Jan. 2, 2025.

(Continued)

*Primary Examiner* — Mark G. Pannell
(74) *Attorney, Agent, or Firm* — Sheppard, Mullin, Richter & Hampton LLP

(57) ABSTRACT

The embodiments of the present disclosure provide a wireless communication method, a device, and a storage medium. The method includes: transmitting, by a first access network device, a paging message to a second access network device, the paging message including a first paging cause value.

20 Claims, 4 Drawing Sheets

(56) References Cited

U.S. PATENT DOCUMENTS

| | | | | |
|---|---|---|---|---|
| 2022/0191824 A1* | 6/2022 | Kumar | .................. | H04W 68/02 |
| 2023/0199715 A1* | 6/2023 | Wang | .................. | H04W 68/005 |
| | | | | 455/458 |

FOREIGN PATENT DOCUMENTS

| | | |
|---|---|---|
| CN | 110139361 A | 8/2019 |
| CN | 112166634 A | 1/2021 |
| IN | 202042015019 A | 10/2020 |
| WO | 2020106611 A1 | 5/2020 |
| WO | 2020185949 A2 | 9/2020 |
| WO | 2021015502 A1 | 1/2021 |

OTHER PUBLICATIONS

Communication pursuant to Article 94(3) EPC issued by the European Patent Office for Application No. 21921879.9 mailed on Mar. 27, 2025.

Office Action issued by the European Patent Office for Application No. EP21921879.9 mailed on Oct. 23, 2024.

Office Action issued by the Chinese Patent Office for Application No. CN202311316969.5 mailed on Sep. 30, 2024.

Discussion on paging cause for multi-SIM; OPPO; 3GPP TSG_RAN WG2 Meeting #112 electronic; R2-2008873; Online, Nov. 2-13, 2020.

International Search Report and Written Opinion dated Oct. 26, 2021 in International Application No. PCT/CN2021/074468. English translation attached.

"3rd Generation Partnership Project;Technical Specification Group Radio Access Network;NG-RAN; NG Application Protocol (NGAP) (Release 16)" 3GPP TS 38.413 V16.3.0, Sep. 2020, 8 and/or 9.2.

"3rd Generation Partnership Project; Technical Specification Group Radio Access Network;NG-RAN; Xn application protocol (XnAP) (Release 16)" 3GPP TS 38.423 V16.3.0, Sep. 2020, 8.2.5 and/or 9.3.

Huawei, "RAN paging enhancement"3GPP TSG-RAN WG3 Meeting #97bis R3-173704, Oct. 2017 (Oct. 2017), 6 pages.

"3rd Generation Partnership Project; Technical Specification Group Services and System Aspects; Study on system enablers for devices having multiple Universal Subscriber Identity Modules (USIM)(Release 17)" 3GPP TR 23.761 V1.2.0, Nov. 18, 2020, 108 pages.

OPPO, "Discussion on graceful leaving and busy indication"3GPP TSG-RAN WG2 Meeting #112 electronic R2-2008872, Nov. 2020 (2020-110, 9 pages.

Extended European Search Report dated Feb. 27, 2024 received in European Patent Application No. EP21921879.9.

Communication pursuant to Article 94(3) EPC issued by the European Patent Office for Application No. 21921879.9 mailed on Aug. 22, 2025.

* cited by examiner

Access Network Device
600
Comm. Unit 610
FIG. 6
Network Device 700
Comm. Unit 710
FIG. 7
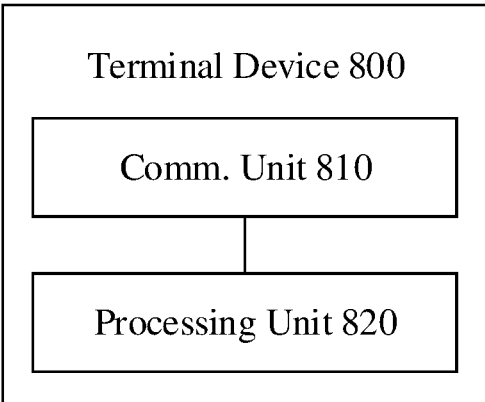
Terminal Device 800
Comm. Unit 810
Processing Unit 820
FIG. 8

WIRELESS COMMUNICATION METHOD FOR PAGING PROCESS, AND DEVICE

CROSS-REFERENCE TO RELATED APPLICATIONS

This application is a continuation of International Application No. PCT/CN2021/074468 filed on Jan. 29, 2021, the entire content of which is incorporated herein by reference.

TECHNICAL FIELD

The embodiments of the present disclosure relate to the field of the communication, and more particularly, to a wireless communication method, a device and a storage medium.

BACKGROUND

Currently, paging processes can be divided into a paging process initiated by a core network and a paging process transmitted by an access network. Here, the paging process transmitted by the access network includes: the access network releasing a terminal device from a connected state to a Radio Resource Control (RRC) inactive state (RRC_I-NACTIVE), (at this time the access network still stores an Access Stratum (AS) context of the terminal device, and the access network device that stores the AS context of the terminal device is referred to as an anchor access network device). When the anchor access network device releases the terminal device from the connected state to the inactive state, it will configure paging area configuration information for the terminal device, and the paging area configuration information is used to determine the anchor access network device is to initiate the paging process to which access network devices, and at this time the connection for the terminal device is still maintained between the access network and the core network. For the core network device, the terminal device is still in the connected state. When downlink user data arrives, the core network device directly transmits the user data to the anchor access network device, and the anchor access network device initiates a paging process for the terminal device after determining that the terminal device is in the inactive state. During the paging process, the anchor access network device will transmit a paging message to the access network devices contained in the above paging area configuration information. The access network devices will trigger corresponding paging processes via their respective air interfaces.

However, the current paging process transmitted by the access network is not conducive to service priority decision by the terminal device.

SUMMARY

The embodiments of the present disclosure provide a wireless communication method, a device, and a storage medium.

In a first aspect, a wireless communication method is provided. The method includes: transmitting, by a first access network device, a paging message to a second access network device, the paging message including a first paging cause value.

In a second aspect, a wireless communication method is provided. The method includes: receiving, by a terminal device, a paging message transmitted by a second access network device, the paging message including a first paging cause value.

In a third aspect, an access network device is provided. The access network device is a first access network device and includes a processor and a memory. The memory has a computer program stored thereon, and the processor is configured to invoke and execute the computer program stored in the memory to perform the wireless communication method including: transmitting, by a first access network device, a paging message to a second access network device, the paging message including a first paging cause value.

In a fourth aspect, a terminal device is provided. The terminal device includes a processor and a memory. The memory has a computer program stored thereon, and the processor is configured to invoke and execute the computer program stored in the memory to perform the method of the second aspect.

BRIEF DESCRIPTION OF DRAWINGS

FIG. 6 is a schematic block diagram of an access network device 600 according to another embodiment of the present disclosure.

FIG. 7 is a schematic block diagram of a network device 700 according to an embodiment of the present disclosure.

FIG. 8 is a schematic block diagram of a terminal device 800 according to an embodiment of the present disclosure.

DESCRIPTION OF EMBODIMENTS

The technical solutions in the embodiments of the present disclosure will be described below with reference to the figures in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

Figure 1:
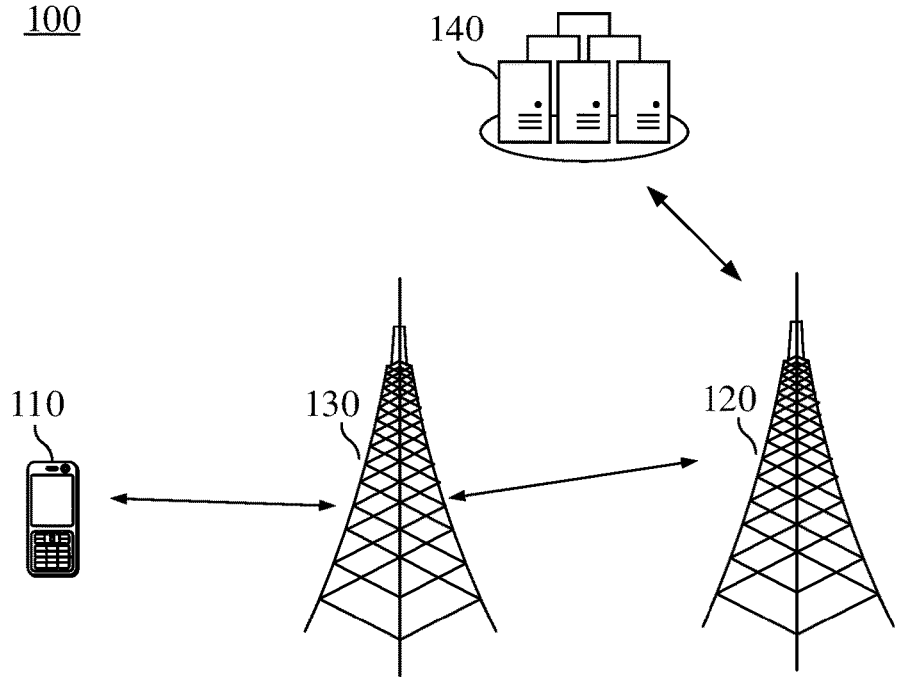
FIG. 1 is a schematic diagram showing an application scenario of an embodiment of the present disclosure.

FIG. 1 is a schematic diagram showing an application scenario of an embodiment of the present disclosure.

As shown in FIG. 1, the communication system 100 may include a terminal device 110, a first access network device 120, a second access network device 130 and a core network device 140. Here, the first access network device 120 may be an anchor access network device in a paging process transmitted by the access network, that is, an access network device that stores an AS context of the terminal device. The second access network device 130 may be any access network device in paging area configuration information configured for the terminal device 110. The second access network device 130 can communicate with the terminal device 110 via an air interface. Multi-service transmission is supported between the terminal device 110 and the second access network device 130.

It should be understood that the embodiments of the present disclosure are described using the communication system 100 as an example only, but the embodiments of the present disclosure is not limited to this. That is, the solutions according to the embodiments of the present disclosure can be applied to various communication systems, including for example: Long Term Evolution (LTE) system, LTE Time Division Duplex (LTE-TDD) system, Universal Mobile Telecommunication System (UMTS), the $5^{th}$ Generation (5G) system (or referred to as New Radio or NR communication system), or any future communication system.

Taking the 5G communication system as an example, the main application scenarios of 5G are: Enhance Mobile Broadband (eMBB), Ultra-Reliable and Low Latency Communication (URLLC), and massive Machine Type of Communication (mMTC). The eMBB still aims at users' access to multimedia content, services and data, and its demand is growing rapidly. Since the eMBB may be deployed in different scenarios, such as indoors, urban areas, and rural areas, its capabilities and requirements vary greatly, so it cannot be generalized and should be analyzed in combination with specific deployment scenarios. Typical applications of URLLC include: industrial automation, power automation, telemedicine operations (surgery), traffic safety guarantee, etc. The typical characteristics of mMTC include: high connection density, small data volume, delay-insensitive services, and low cost and long life-time of modules, etc.

In the 5G network environment, in order to reduce air interface signaling and quickly restore wireless connections and data services, a new Radio Resource Control (RRC) state is defined, that is, RRC_INACTIVE state. This state is different from RRC_IDLE and RRC_CONNECTED) states. In the RRC_IDLE state, mobility is terminal device based cell selection and reselection, paging is initiated by a Core Network (CN), and the paging area is configured by the CN. There is no terminal device Access Stratum (AS) context at the access network device, and there is no RRC connection. In the RRC_CONNECTED state, there is an RRC connection, and the access network device and the terminal device have the terminal device AS context. The access network device knows the location of the terminal device at the specific cell level. Mobility is mobility controlled by the access network device. Unicast data can be transmitted between the terminal device and the access network device. In the RRC_INACTIVE state, mobility is terminal device based cell selection and reselection, there is a connection between CN-NR, there is terminal device AS context on a certain access network device (i.e., anchor access network device), paging is triggered by a Radio Access Network (RAN), and RAN-based paging area is managed by the RAN, and the anchor access network device knows the location of the terminal device at the RAN-based paging area level.

In the communication system 100 shown in FIG. 1, the first access network device 120 and the second access network device 130 can provide communication coverage for a specific geographical area, and can communicate with the terminal device 110 located in the coverage area.

Both the first access network device 120 and the second access network device 130 may be an Evolutional Node B (eNB or eNodeB) in the Long Term Evolution (LTE) system, or a Next Generation Radio Access Network (NG RAN) device, or a base station (gNB) in the NR system, or a wireless controller in a Cloud Radio Access Network (CRAN), or the access network device 120 may be a relay station, an access point, a vehicle-mounted device, a wearable device, a hub, a switch, a bridge, a router, or an access network device in a future evolved Public Land Mobile Network (PLMN), or the like.

The terminal device 110 may be any terminal device, including but not limited to a terminal device connected to the first access network device 120, the second access network device 130 or other terminal devices via wired or wireless connections.

For example, the terminal device may refer to an access terminal, a User Equipment (UE), a user unit, a user station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the 5G network, or a terminal device in a future evolved network, etc.

The terminal device 110 may be used for Device to Device (D2D) communication.

The core network device 140 may be a 5G Core (5GC) device, for example, an Access and Mobility Management Function (AMF), an Authentication Server Function (AUSF), a User Plane Function (UPF), or a Session Management Function (SMF). Alternatively, the core network device 140 may also be an Evolved Packet Core (EPC) device of the LTE network, for example, a Session Management Function+Core Packet Gateway (SMF+PGW-C) device. It should be understood that the SMF+PGW-C can provide the functions of both SMF and PGW-C. In the process of network evolution, the above core network devices may have other names, or new network entities may be formed by dividing functions of the core network, and the embodiments of the present disclosure are not limited to this.

Various functional units in the communication system 100 may also establish connections via Next Generation (NG) interfaces for communication.

For example, the terminal device establishes an air interface connection with the first access network device and the second access network device via an NR interface to transmit user plane data and control plane signaling. The terminal device can establish a control plane signaling connection with the AMF via NG interface 1 (referred to as N1). The first access network device and the second access network device, such as a next generation radio access base station (gNB), can establish a user plane data connection with the UPF via NG interface 3 (referred to as N3). The first access network device and the second access network device can establish a control plane signaling connection with the AMF via NG interface 2 (referred to as N2). The UPF can establish a control plane signaling connection with the SMF via NG interface 4 (referred to as N4). The UPF can exchange user plane data with the data network via NG interface 6 (referred to as N6). The AMF can establish a control plane signaling connection with the SMF via NG interface 11 (referred to as N11). The SMF can establish a control plane signaling connection with the PCF via NG interface 7 (referred to as N7).

FIG. 1 exemplarily shows one first access network device, one second access network device, one core network device and one terminal device. Optionally, the wireless communication system 100 may include a different number of access network devices, and the coverage of each access network device may include other numbers of terminal devices. The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the first access network device 120, the second access network device 130, and the terminal device 110 with communication functions. The first access network device 110, the second access network device 130, and the terminal device 120 may be the devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein.

As described above, the paging processes include the paging process initiated by the core network and the paging process initiated by the access network.

In the paging process initiated by the core network:

Phase 1: The terminal device completes a registration process and obtains Registration Area (RA) configuration information configured by the core network.

Phase 2: The terminal device is in an idle state from the perspective of the core network. When downlink user data arrives, the core network transmits a paging message to access network devices included in the terminal device's registration area configuration information. After receiving the paging message triggered by the core network, the access network triggers a corresponding paging process via an air interface.

In the paging procedure initiated by the access network:

Phase 1: The access network releases the terminal device from the connected state to the inactive state. At this time, the anchor access network device still stores the AS context of the terminal device. Here, when the anchor access network device releases the terminal device from the connected state to the inactive state, it will configure paging area configuration information for the terminal device, and at this time the connection for the terminal device is still maintained between the access network and the core network Phase 2: From the perspective of the core network device, the terminal device is still in the connected state. When downlink user data arrives, the core network device directly transmits the user data to the anchor access network device, and the anchor access network device initiates a paging process for the terminal device after determining that the terminal device is in the inactive state. During the paging process, the anchor access network device will transmit a paging message to the access network devices included in the above paging area configuration information. These access network devices will trigger corresponding paging processes via their respective air interfaces.

As described above, the current paging process transmitted by the access network is not conducive to service priority decision by the terminal device.

In order to solve the above technical problems, according to the present disclosure, a paging cause value is carried in a paging message during a paging process transmitted by an access network, such that a terminal device can decide a service priority according to the paging cause value.

The technical solutions of the present disclosure will be described in detail below.

Figure 2:
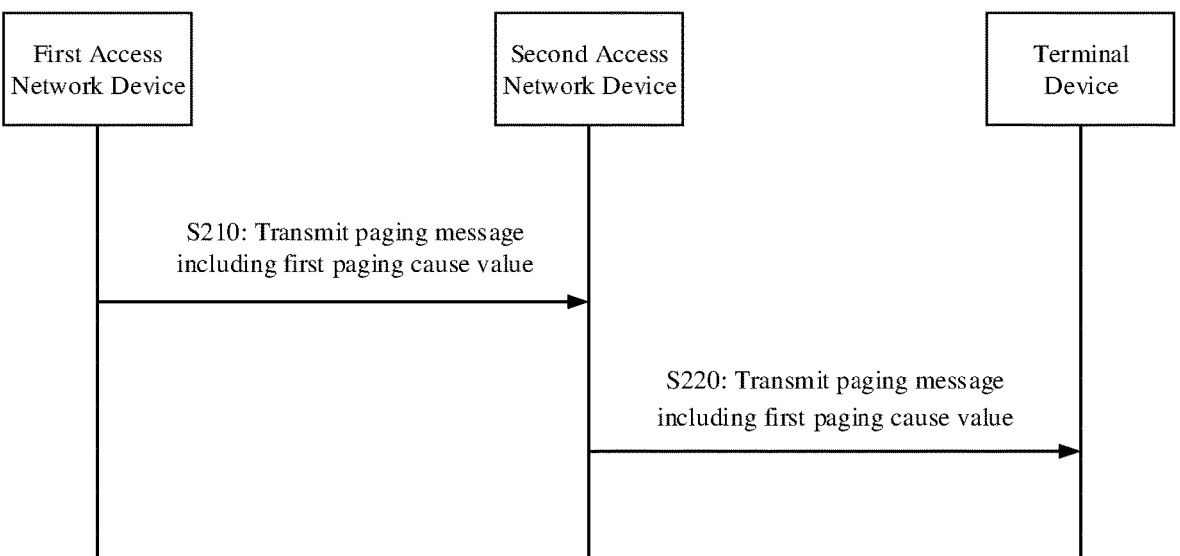
FIG. 2 is an interactive flowchart illustrating a wireless communication method according to an embodiment of the present disclosure.

FIG. 2 is an interactive flowchart illustrating a wireless communication method according to embodiment of the present disclosure. As shown in FIG. 2, the method includes the following steps.

At S210, a first access network device transmits a paging message to a second access network device, the paging message including a first paging cause value.

At S220, the second access network device transmits the paging message to a terminal device.

It should be understood that the first access network device may be an anchor access network device in a paging process transmitted by the access network. The second access network device may be any access network device in the paging area configuration information configured for the terminal device.

It should be understood that, in the present disclosure, each paging cause value may correspond to one paging cause, that is, one paging cause value represents one paging cause. The paging cause value is also referred to as paging cause index, paging cause parameter, etc., and the present disclosure is not limited to this.

Optionally, in the present disclosure, any paging cause may be any of: voice, video, short message, high priority service, data, and Non-Access Stratum (NAS) signaling.

Optionally, in order to prevent the paging cause value from being intercepted by a third-party organization, the core network can formulate an encryption rule for the paging cause value. The core idea is to map the paging cause value to be encrypted into pseudo-random identification information using a specific mapping algorithm. Based on this, the first paging cause value may be an encrypted paging cause value. Of course, the first paging cause value may alternatively be an unencrypted paging cause value, and the present disclosure is not limited to this.

It should be understood that the encryption rule may also be referred to as a security mapping rule, and the present disclosure is not limited to this.

Optionally, when the first paging cause value is an encrypted paging cause value, the terminal device may decrypt the first paging cause value using a decryption rule.

It should be understood that the above decryption rule may be an inverse algorithm of the above encryption rule.

Optionally, for the terminal device, the decryption rule may be pre-configured for the terminal device, or may be obtained via a NAS process. The present disclosure is not limited to any specific way in which the terminal device obtains the decryption rule.

Optionally, after the terminal device obtains the first paging cause value, the terminal device may make a service priority decision according to the first paging cause value.

Exemplarily, when the first paging cause value is a paging cause value corresponding to voice, whose priority is higher than other services, the terminal device may process the voice related paging message first. When the first paging cause value is a paging cause value corresponding to short message, whose priority is lower than other services, the terminal device may process other services first, and then process the short message related paging message.

In the present disclosure, during the paging process transmitted by the access network, the paging cause value may be carried in the paging message, such that the terminal device can make the service priority decision according to the paging cause value.

Optionally, in the present disclosure, the first access network device may obtain assistance paging cause value information from the network device, and the paging cause value assistance information is used to assist the first access network device to determine the first paging cause value.

Optionally, the network device may be a core network device or an Operation, Administration and Maintenance (OAM) node, and the present disclosure is not limited to this.

Assuming that the paging cause value assistance information is obtained from the core network device, based on this, the wireless communication method will be further described below.

Figures 3, 4, 5:
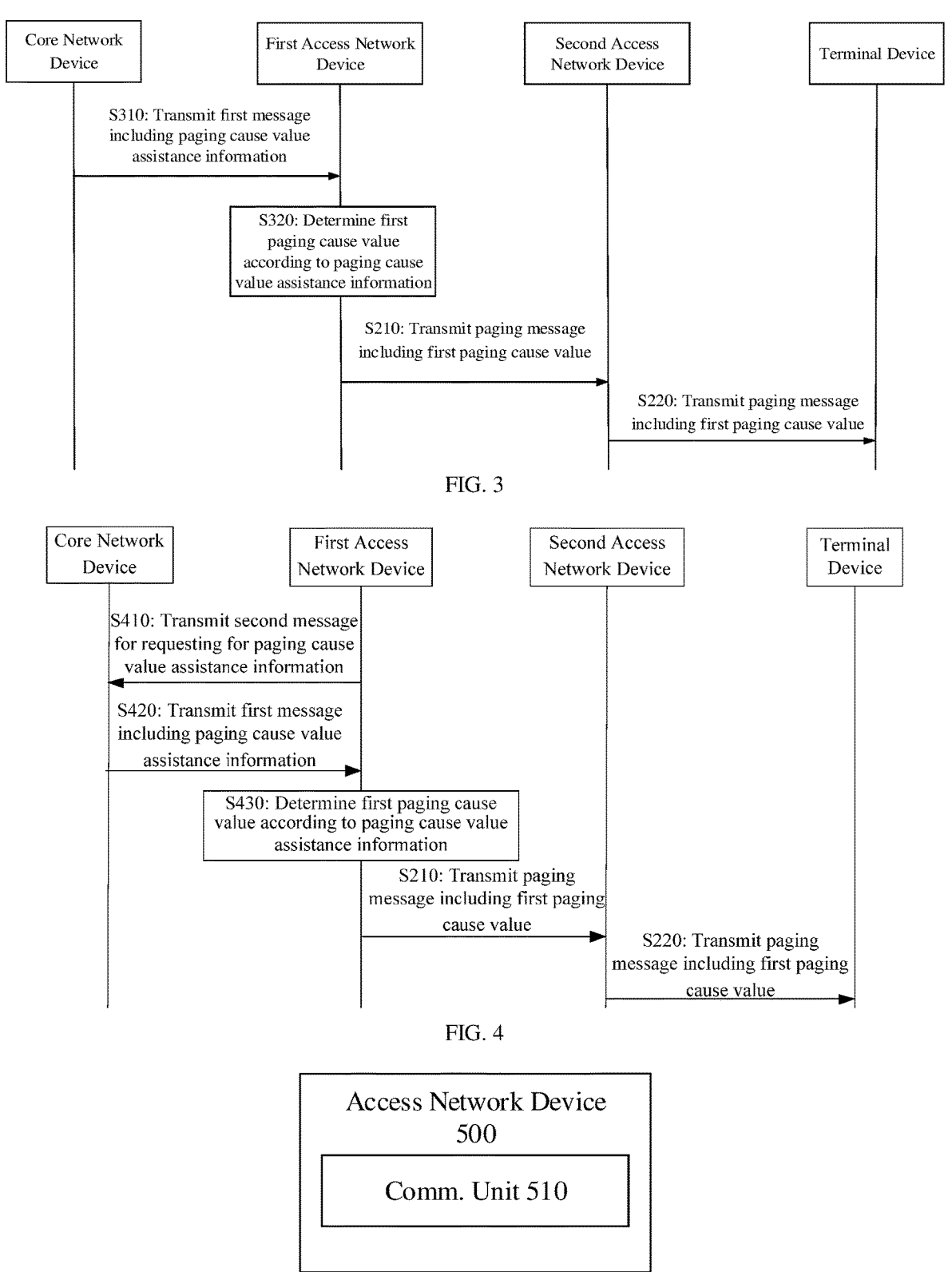
FIG. 3 is an interactive flowchart illustrating another wireless communication method according to an embodiment of the present disclosure.
FIG. 4 is an interactive flowchart illustrating yet another wireless communication method according to an embodiment of the present disclosure.
FIG. 5 is a schematic block diagram of an access network device 500 according to an embodiment of the present disclosure.

FIG. 3 is an interactive flowchart illustrating another wireless communication method according to an embodiment of the present disclosure. As shown in FIG. 3, the method includes the following steps.

Optionally, the following steps may also be performed before S210.

At S310, the network device transmits a first message to the first access network device, the first message including paging cause value assistance information.

At S320, the first access network device determines the first paging cause value according to the paging cause value assistance information.

FIG. 4 is an interactive flowchart illustrating another wireless communication method according to an embodiment of the present disclosure. As shown in FIG. 4, the method includes the following steps.

Optionally, the following steps may also be performed before S210.

At S410, the first access network device transmits a second message to a core network device, the second message being used to request for the paging cause value assistance information.

At S420, the network device transmits a first message to the first access network device, the first message including paging cause value assistance information.

At S430, the first access network device determines the first paging cause value according to the paging cause value assistance information.

It should be understood that the first message may be triggered by a process initiated by the first access network device, as shown in FIG. 3, or the first message may be triggered by a process initiated by the core network device, as shown in FIG. 4.

Optionally, the paging cause value assistance information may include, but not limited to, at least one of:

(1) at least one paging cause value;

(2) a Protocol Data Unit (PDU) session identifier associated with each paging cause value;

(3) a Quality of Service (QoS) flow value associated with each paging cause value;

(4) a slice identifier associated with each paging cause value; and (5) an encryption rule to be followed for a paging cause value to be encrypted.

It should be understood that, in the present disclosure, each QoS flow value may correspond to one QoS flow, that is, one QoS flow value represents one QoS flow. The QoS flow value may also be referred to as QoS flow index, QoS flow parameter, etc., and the present disclosure is not limited to this.

It should be understood that, in the present disclosure, a slice identifier may also be referred to as a network slice identifier, and the present disclosure is not limited to this.

It should be understood that, for the encryption rule, reference may be made to the above description of the encryption rule, and the present disclosure is not limited to this.

Optionally, any of the at least one paging cause value may be an encrypted paging cause value or an unencrypted paging cause value.

Optionally, the first message may be a dedicated message for a specific terminal device, or a common message not specific to any terminal device.

Optionally, when the first message is the dedicated message for the specific terminal device, the first message may be, but not limited to, any of:

a PDU session establishment message for the specific terminal device;

a PDU session modification message for the specific terminal device;

a PDU session re-establishment message for the specific terminal device;

a PDU session release message for the specific terminal device;

a context create message for the specific terminal device;

a context modification message for the specific terminal device;

a context re-create message for the specific terminal device;

a context release message for the specific terminal device; and an RRC state obtaining message for the specific terminal device.

It should be noted that the PDU session establishment message here may also be referred to as any message transmitted by the network device to the first access network device in a PDU session establishment process. The PDU session modification message may also be referred to as any message transmitted by the network device to the first access network device in a PDU session modification process. The PDU session reestablishment message may also be referred to as any message transmitted by the network device to the first access network device in a PDU session reestablishment process. The PDU session release message may also be referred to as any message transmitted by the network device to the first access network device in a PDU session release process. The context create message may also be referred to as any message transmitted by the network device to the first access network device in a context create process. The context modification message may also be referred to as any message transmitted by the network device to the first access network device in a context modification process. The context re-create message may also be referred to as any message transmitted by the network device to the first access network device in a context re-create process. The context release message may also be referred to as any message transmitted by the network device to the first access network device in a context release process. The RRC state obtaining message may also be referred to as any message transmitted by the network device to the first access network device in an RC state obtaining process.

Optionally, when the first message is the common message not specific to any terminal device, the first message may be any of:

an interface initialization message; an interface update message; a resource report message; and an exception report message.

It should be noted that the interface initialization message may also be referred to as any message transmitted by the network device to the first access network device in an interface initialization process. The interface update message may also be referred to as any message transmitted by the network device to the first access network device in an interface update process. The resource report message may also be referred to as any message transmitted by the network device to the first access network device in a resource report process. The exception report message may also be referred to as any message transmitted by the network device to the first access network device in an exception report process.

Optionally, the second message may be an empty message or a non-empty message.

It should be understood that the empty message may be a message newly defined by the first access network device, and may be used to request for the paging cause value assistance information.

It should be understood that the non-empty message may be a message newly defined by the first access network device, or a message defined by the first access network device based on an existing message.

Optionally, when the second message is a non-empty message, the second message may be a dedicated message for a specific terminal device, or a common message not specific to any terminal device.

Optionally, when the second message is the dedicated message for the specific terminal device, the second message may be any of:

a PDU session establishment message for the specific terminal device;

a PDU session modification message for the specific terminal device;

a PDU session re-establishment message for the specific terminal device;

a PDU session release message for the specific terminal device;

a context create message for the specific terminal device;

a context modification message for the specific terminal device;

a context re-create message for the specific terminal device;

a context release message for the specific terminal device; and an RRC state obtaining message for the specific terminal device.

It should be noted that the PDU session establishment message here may also be referred to as any message transmitted by the first access network device to the network device in a PDU session establishment process. The PDU session modification message may also be referred to as any message transmitted by the first access network device to the network device in a PDU session modification process. The PDU session reestablishment message may also be referred to as any message transmitted by the first access network device to the network device in a PDU session reestablishment process. The PDU session release message may also be referred to as any message transmitted by the first access network device to the network device in a PDU session release process. The context create message may also be referred to as any message transmitted by the first access network device to the network device in a context create process. The context modification message may also be referred to as any message transmitted by the first access network device to the network device in a context modification process. The context re-create message may also be referred to as any message transmitted by the first access network device to the network device in a context re-create process. The context release message may also be referred to as any message transmitted by the first access network device to the network device in a context release process. The RRC state obtaining message may also be referred to as any message transmitted by the first access network device to the network device in an RRC state obtaining process.

Optionally, when the second message is the common message not specific to any terminal device, the second message may be any of: an interface initialization message; an interface update message; a resource report message; and an exception report message.

It should be noted that the interface initialization message may also be referred to as any message transmitted by the first access network device to the network device in an interface initialization process. The interface update message may also be referred to as any message transmitted by the first access network device to the network device in an interface update process. The resource report message may also be referred to as any message transmitted by the first access network device to the network device in a resource report process. The exception report message may also be referred to as any message transmitted by the first access network device to the network device in an exception report process.

Optionally, when the second message is a non-empty message, the second message may include, but not limited to, at least one of:

(1) indication information for requesting the paging cause value assistance information from the core network device;

(2) PDU session identification list information for which the paging cause value assistance information needs to be obtained;

(3) QoS flow value list information for which the paging cause value assistance information needs to be obtained;

(4) slice identifier list information for which the paging cause value assistance information needs to be obtained; and (5) indication information indicating that an encryption rule to be followed for a paging cause value to be encrypted needs to be obtained.

The indication information in (1) is used to request the paging cause value assistance information from the core network device. The indication information in (5) is used to obtain the above encryption rule.

Optionally, after obtaining the paging cause value assistance information, the first access network device may determine the first paging cause value according to a certain selection rule. For example, the paging cause value assistance information may include at least one paging cause value and a PDU identifier associated with each paging cause value, then the first access network device may determine the first paging cause value according to a PDU identifier of the terminal device and a mapping relationship between PDU identifiers and paging cause values. Alternatively, the paging cause value assistance information may include at least one paging cause value and a QoS flow value associated with each paging cause value, then the first access network device can determine the first paging cause value according to a QoS flow value of the terminal device and a mapping relationship between QoS flow values and paging cause values. Alternatively, the paging cause value assistance information may include at least one paging cause value and a slice identifier associated with each paging cause value, then the first access network device can determine the first paging cause value according to a slice identifier of the terminal device and a mapping relationship between slice identifiers and paging cause values. Certainly, the terminal device may also determine the first paging cause value according to at least one item of the paging cause value assistance information, and details thereof will be omitted here.

In the present disclosure, the first access network device may obtain the paging cause value assistance information from the network device, and determine the above first paging cause value according to the paging cause value assistance information, such that during the paging process transmitted by the access network, the first paging cause value may be carried in the paging message, whereby the terminal device can make the service priority decision according to the first paging cause value.

As described above, each paging cause value in the paging cause value assistance information may be associated with a PDU session identifier, a QoS flow value, a slice identifier, and the like.

In the following, the mapping relationship, i.e., the association relationship, between paging cause values and PDU session identifiers, QoS flow values, and slice identifiers will be described.

Optionally, for any of the above at least one paging cause value, the mapping relationship between paging cause values and PDU session identifiers may be a one-to-one, one-to-multiple, or multiple-to-one mapping relationship, and/or the mapping relationship between paging cause values and QoS flow values may be a one-to-one, one-to-multiple, or multiple-to-one mapping relationship, and/or the mapping relationship between paging cause values and slice identifiers may be a one-to-one, one-to-multiple, or multiple-to-one mapping relationship.

In the following, examples of the mapping relationship, i.e., the association relationship, between paging cause values and PDU session identifiers, QoS flow values, and slice identifiers will be described.

Example 1: As shown in Table 1, one paging cause value is mapped to one PDU session identifier:

TABLE 1

| PDU Session ID 1 Paging Cause Value 1 | PDU Session ID 2 Paging Cause Value 2 | . . . . . . | PDU Session ID N Paging Cause Value N |
|---|---|---|---|

Example 2: As shown in Table 2, one paging cause value is mapped to multiple PDU session identifiers:

TABLE 2

| PDU Session ID 11 PDU Session ID 12 | Paging Cause Value 1 |
|---|---|
| PDU Session ID 21 PDU Session ID 22 | Paging Cause Value 2 |
| . . . | . . . |
| PDU Session ID M1 PDU Session ID M2 | Paging Cause Value M |

Example 3: As shown in Table 3, multiple paging cause values are mapped to one PDU session ID:

TABLE 3

| Paging Cause Value 11 Paging Cause Value 12 | PDU SESSION ID 1 |
|---|---|
| Paging Cause Value 21 Paging Cause Value 22 | PDU SESSION ID 2 |
| . . . | . . . |
| Paging Cause Value N1 Paging Cause Value N2 | PDU SESSION ID N |

Example 4: As shown in Table 4, one paging cause value is mapped to one QoS flow value:

TABLE 4

| QoS Flow Value 1 Paging Cause Value 1 | QoS Flow Value 2 Paging Cause Value 2 | . . . . . . | QoS Flow Value N Paging Cause Value N |
|---|---|---|---|

Example 5: As shown in Table 5, one paging cause value is mapped to multiple QoS flow values:

TABLE 5

| QoS Flow Value 11 QoS Flow Value 12 | Paging Cause Value 1 |
|---|---|
| QoS Flow Value 21 QoS Flow Value 22 | Paging Cause Value 2 |
| . . . | . . . |
| QoS Flow Value M1 QoS Flow Value M2 | Paging Cause Value M |

Example 6: As shown in Table 6, multiple paging cause values are mapped to one QoS flow value:

TABLE 6

| Paging Cause Value 11 Paging Cause Value 12 | QoS Flow Value 1 |
|---|---|
| Paging Cause Value 21 Paging Cause Value 22 | QoS Flow Value 2 |
| . . . | . . . |
| Paging Cause Value N1 Paging Cause Value N2 | QoS Flow Value N |

Example 7: As shown in Table 7, one paging cause value is mapped to one slice identifier:

TABLE 7

| Slice Identifier 1 Paging Cause Value 1 | Slice Identifier 2 Paging Cause Value 2 | . . . . . . | Slice Identifier N Paging Cause Value N |
|---|---|---|---|

Example 8: As shown in Table 8, one paging cause value is mapped to multiple slice identifiers:

TABLE 8

| Slice Identifier 11 Slice Identifier 12 | Paging Cause Value 1 |
|---|---|
| Slice Identifier 21 Slice Identifier 22 | Paging Cause Value 2 |
| . . . | . . . |
| Slice Identifier M1 Slice Identifier M2 | Paging Cause Value M |

Example 9: As shown in Table 9, multiple paging cause values are mapped to one slice identifier:

TABLE 9

| | |
|---|---|
| Paging Cause Value 11 | Slice Identifier 1 |
| Paging Cause Value 12 | |
| Paging Cause Value 21 | Slice Identifier 2 |
| Paging Cause Value 22 | |
| . . . | . . . |
| Paging Cause Value N1 | Slice Identifier N |
| Paging Cause Value N2 | |

Example 10: As shown in Table 10, one paging cause value is mapped to one PDU session identifier, and the paging cause value is mapped to a set of QoS flow values associated with the PDU session identifier:

TABLE 10

| | | |
|---|---|---|
| PDU SESSION ID 1 | QoS Flow Value 11 | Paging Cause Value 1 |
| | QoS Flow Value 12 | |
| PDU SESSION ID 2 | QoS Flow Value 21 | Paging Cause Value 2 |
| | QoS Flow Value 22 | |
| . . . | . . . | . . . |
| PDU SESSION ID M | QoS Flow Value M1 | Paging Cause Value M |
| | QoS Flow Value M2 | |

Example 11: As shown in Table 11, one paging cause value is mapped to one PDU session identifier, and the paging cause value is mapped to one QoS flow value associated with the PDU session identifier:

TABLE 11

| | | |
|---|---|---|
| PDU SESSION ID 1 | QoS Flow Value 11 | Paging Cause Value 11 |
| | QoS Flow Value 12 | Paging Cause Value 12 |
| PDU SESSION ID 2 | QoS Flow Value 21 | Paging Cause Value 21 |
| | QoS Flow Value 22 | Paging Cause Value 22 |
| . . . | . . . | . . . |
| PDU SESSION ID M | QoS Flow Value M1 | Paging Cause Value M1 |
| | QoS Flow Value M2 | Paging Cause Value M2 |

Example 12: As shown in Table 12, one paging cause value is mapped to one slice identifier, and the paging cause value is mapped to a set of PDU session identifiers associated with the slice identifier:

TABLE 12

| | | |
|---|---|---|
| Slice Identifier 1 | PDU SESSION ID 11 | Paging Cause Value 1 |
| | PDU SESSION ID 12 | |
| Slice Identifier 2 | PDU SESSION ID 21 | Paging Cause Value 2 |
| | PDU SESSION ID 22 | |
| . . . | . . . | . . . |
| Slice Identifier M | PDU SESSION ID M1 | Paging Cause Value M |
| | PDU SESSION ID M2 | |

Example 13: As shown in Table 13, one paging cause value is mapped to one slice identifier, and the paging cause value is mapped to one PDU session identifier associated with the slice identifier:

TABLE 13

| | | |
|---|---|---|
| Slice Identifier 1 | PDU SESSION ID 11 | Paging Cause Value 11 |
| | PDU SESSION ID 12 | Paging Cause Value 12 |
| Slice Identifier 2 | PDU SESSION ID 21 | Paging Cause Value 21 |
| | PDU SESSION ID 22 | Paging Cause Value 22 |
| . . . | . . . | . . . |

TABLE 13-continued

| | | |
|---|---|---|
| Slice Identifier M | PDU SESSION ID M1 | Paging Cause Value M1 |
| | PDU SESSION ID M2 | Paging Cause Value M2 |

Example 14: As shown in Table 14, one paging cause value is mapped to one slice identifier, and the paging cause value is mapped to a set of QoS flow values associated with the slice identifier:

TABLE 14

| | | |
|---|---|---|
| Slice Identifier 1 | QoS Flow Value 11 | Paging Cause Value 1 |
| | QoS Flow Value 12 | |
| Slice Identifier 2 | QoS Flow Value 21 | Paging Cause Value 2 |
| | QoS Flow Value 22 | |
| . . . | . . . | . . . |
| Slice Identifier M | QoS Flow Value M1 | Paging Cause Value M |
| | QoS Flow Value M2 | |

Example 15: As shown in Table 15, one paging cause value is mapped to one slice identifier, and the paging cause value is mapped to one QoS flow value associated with the slice identifier:

TABLE 15

| | | |
|---|---|---|
| Slice Identifier 1 | QoS Flow Value 11 | Paging Cause Value 11 |
| | QoS Flow Value 12 | Paging Cause Value 12 |
| Slice Identifier 2 | QoS Flow Value 21 | Paging Cause Value 21 |
| | QoS Flow Value 22 | Paging Cause Value 22 |
| . . . | . . . | . . . |
| Slice Identifier M | QoS Flow Value M1 | Paging Cause Value M1 |
| | QoS Flow Value M2 | Paging Cause Value M2 |

Example 16: As shown in Table 16, one paging cause value is mapped to one slice identifier, and the paging cause value is mapped to one PDU session identifier associated with the slice identifier, and the paging cause value is mapped to a set of QoS flow values associated with the PDU session identifier:

TABLE 16

| Slice | PDU SESSION | QoS Flow Value | Paging Cause Value |
|---|---|---|---|
| Identifier 1 | ID 11 | 111 | 111 |
| | | QoS Flow Value 112 | Paging Cause Value 112 |
| Slice | PDU SESSION | QoS Flow Value | Paging Cause Value |
| Identifier 2 | ID 21 | 211 | 211 |
| | | QoS Flow Value 212 | Paging Cause Value 212 |
| . . . | . . . | . . . | . . . |
| Slice | PDU SESSION | QoS Flow Value | Paging Cause Value |
| Identifier M | ID M1 | M11 | M11 |
| | | QoS Flow Value M12 | Paging Cause Value M12 |

It should be understood that the above are examples of the mapping relationship, i.e., the association relationship, between paging cause values and PDU session identifiers, QoS flow values, and slice identifiers.

FIG. 5 shows a schematic block diagram of an access network device 500 according to an embodiment of the present disclosure. The access network device 500 is a first access network device. As shown in FIG. 5, a communication unit 510 is configured to transmit a paging message to a second access network device, the paging message including a first paging cause value.

Optionally, the communication unit 510 may be further configured to: obtain paging cause value assistance information from a network device. The paging cause value assistance information is used to assist the first access network device to determine the first paging cause value.

Optionally, the paging cause value assistance information may include at least one of:

at least one paging cause value;

a Protocol Data Unit (PDU) session identifier associated with each paging cause value;

a Quality of Service (QoS) flow value associated with each paging cause value;

a slice identifier associated with each paging cause value; and an encryption rule to be followed for a paging cause value to be encrypted.

Optionally, a mapping relationship between paging cause values and PDU session identifiers may be a one-to-one, one-to-multiple, or multiple-to-one mapping relationship; a mapping relationship between paging cause values and QoS flow values may be a one-to-one, one-to-multiple, or multiple-to-one mapping relationship; and/or a mapping relationship between paging cause values and slice identifiers may be a one-to-one, one-to-multiple, or multiple-to-one mapping relationship.

Optionally, any one of the at least one paging cause value may be an encrypted paging cause value or an unencrypted paging cause value.

Optionally, the network device may be a core network device or an Operation, Administration and Maintenance (OAM) node.

Optionally, when the network device is the core network device, the communication unit 510 may be configured to: receive a first message transmitted by the core network device, the first message including the paging cause value assistance information.

Optionally, the first message may be a dedicated message for a specific terminal device, or may be a common message not specific to any terminal device.

Optionally, when the first message is the dedicated message for the specific terminal device, the first message may be any of:

a PDU session establishment message for the specific terminal device;

a PDU session modification message for the specific terminal device;

a PDU session re-establishment message for the specific terminal device;

a PDU session release message for the specific terminal device;

a context create message for the specific terminal device;

a context modification message for the specific terminal device;

a context re-create message for the specific terminal device;

a context release message for the specific terminal device; and a Radio Resource Control (RRC) state obtaining message for the specific terminal device.

Optionally, when the first message is the common message not specific to any terminal device, the first message may be any of:

an interface initialization message;

an interface update message;

a resource report message; and an exception report message.

Optionally, the first message may be triggered by a process initiated by the first access network device, or may be triggered by a process initiated by the core network device.

Optionally, the communication unit 510 may be further configured to, when the first message is triggered by the process initiated by the first access network device: transmit a second message to the core network device, the second message being used to request for the paging cause value assistance information.

Optionally, the second message may be an empty message or a non-empty message.

Optionally, when the second message is the non-empty message, the second message may be a dedicated message for a specific terminal device, or may be a common message not specific to any terminal device.

Optionally, when the second message is the dedicated message for the specific terminal device, the second message may be any of:

a PDU session establishment message for the specific terminal device;

a PDU session modification message for the specific terminal device;

a PDU session re-establishment message for the specific terminal device;

a PDU session release message for the specific terminal device;

a context create message for the specific terminal device;

a context modification message for the specific terminal device;

a context re-create message for the specific terminal device;

a context release message for the specific terminal device; and an RRC state obtaining message for the specific terminal device.

Optionally, when the second message is the common message not specific to any terminal device, the second message may be any of:

an interface initialization message;

an interface update message;

a resource report message; and an exception report message.

Optionally, when the second message is a non-empty message, the second message may include at least one of:

indication information for requesting the paging cause value assistance information from the core network device;

PDU session identification list information for which the paging cause value assistance information needs to be obtained;

QoS flow value list information for which the paging cause value assistance information needs to be obtained;

slice identifier list information for which the paging cause value assistance information needs to be obtained; and indication information indicating that an encryption rule to be followed for a paging cause value to be encrypted needs to be obtained.

Optionally, the first paging cause value may be an encrypted paging cause value or an unencrypted paging cause value.

Optionally, in some embodiments, the above communication unit may be a communication interface or a transceiver, or an input/output interface of a communication chip or a system-on-chip.

It can be appreciated that the access network device 500 according to the embodiment of the present disclosure may correspond to the first access network device in the method embodiments of the present disclosure, and the above and other operations and/or functions of the respective units in the access network device 500 are provided for the purpose of implementing the process flow corresponding to the first access network device in any of the method embodiments, and details thereof will be not omitted here for brevity.

FIG. 6 shows a schematic block diagram of an access network device 600 according to an embodiment of the present disclosure. The access network device 600 is a second access network device. As shown in FIG. 6, a communication unit 610 is configured to receive a paging message transmitted by a first access network device, the paging message including a first paging cause value.

Optionally, the first paging cause value may be an encrypted paging cause value or an unencrypted paging cause value.

Optionally, in some embodiments, the above communication unit may be a communication interface or a transceiver, or an input/output interface of a communication chip or a system-on-chip.

It can be appreciated that the access network device 600 according to the embodiment of the present disclosure may correspond to the second access network device in the method embodiments of the present disclosure, and the above and other operations and/or functions of the respective units in the access network device 600 are provided for the purpose of implementing the process flow corresponding to the second access network device in any of the method embodiments, and details thereof will be not omitted here for brevity.

FIG. 7 shows a schematic block diagram of a network device 700 according to an embodiment of the present disclosure. As shown in FIG. 7, the network device 700 includes:

a communication unit 710 configured to transmit paging cause value assistance information to the first access network device. The paging cause value assistance information is used to assist the first access network device to determine the first paging cause value.

Optionally, the paging cause value assistance information may include at least one of:

at least one paging cause value;

a Protocol Data Unit (PDU) session identifier associated with each paging cause value;

a Quality of Service (QoS) flow value associated with each paging cause value;

a slice identifier associated with each paging cause value; and an encryption rule to be followed for a paging cause value to be encrypted.

Optionally, a mapping relationship between paging cause values and PDU session identifiers may be a one-to-one, one-to-multiple, or multiple-to-one mapping relationship; a mapping relationship between paging cause values and QoS flow values may be a one-to-one, one-to-multiple, or multiple-to-one mapping relationship; and/or a mapping relationship between paging cause values and slice identifiers may be a one-to-one, one-to-multiple, or multiple-to-one mapping relationship.

Optionally, any one of the at least one paging cause value may be an encrypted paging cause value or an unencrypted paging cause value.

Optionally, the network device may be a core network device or an Operation, Administration and Maintenance (OAM) node.

Optionally, when the network device is the core network device, the communication unit 710 may be configured to transmit a first message to the first access network device, the first message including the paging cause value assistance information.

Optionally, the first message may be a dedicated message for a specific terminal device, or may be a common message not specific to any terminal device.

Optionally, when the first message is the dedicated message for the specific terminal device, the first message may be any of:

a PDU session establishment message for the specific terminal device;

a PDU session modification message for the specific terminal device;

a PDU session re-establishment message for the specific terminal device;

a PDU session release message for the specific terminal device;

a context create message for the specific terminal device;

a context modification message for the specific terminal device;

a context re-create message for the specific terminal device;

a context release message for the specific terminal device; and a Radio Resource Control (RRC) state obtaining message for the specific terminal device.

Optionally, when the first message is the common message not specific to any terminal device, the first message may be any of:

an interface initialization message;

an interface update message;

a resource report message; and an exception report message.

Optionally, the first message may be triggered by a process initiated by the first access network device, or may be triggered by a process initiated by the core network device.

Optionally, the communication unit 710 may be further configured to, when the first message is triggered by the process initiated by the first access network device: receive a second message transmitted by the first access network device, the second message being used to request for the paging cause value assistance information.

Optionally, the second message may be an empty message or a non-empty message.

Optionally, when the second message is the non-empty message, the second message may be a dedicated message for a specific terminal device, or is a common message not specific to any terminal device.

Optionally, when the second message is the dedicated message for the specific terminal device, the second message may be any of:

a PDU session establishment message for the specific terminal device;

a PDU session modification message for the specific terminal device;

a PDU session re-establishment message for the specific terminal device;

a PDU session release message for the specific terminal device;

a context create message for the specific terminal device;

a context modification message for the specific terminal device;

a context re-create message for the specific terminal device;

a context release message for the specific terminal device; and an RRC state obtaining message for the specific terminal device.

Optionally, when the second message is the common message not specific to any terminal device, the second message may be any of:

an interface initialization message;

an interface update message;

a resource report message; and an exception report message.

Optionally, when the second message is a non-empty message, the second message may include at least one of:

indication information for requesting the paging cause value assistance information from the core network device;

PDU session identification list information for which the paging cause value assistance information needs to be obtained;

QoS flow value list information for which the paging cause value assistance information needs to be obtained;

slice identifier list information for which the paging cause value assistance information needs to be obtained; and indication information indicating that an encryption rule to be followed for a paging cause value to be encrypted needs to be obtained.

Optionally, the first paging cause value may be an encrypted paging cause value or an unencrypted paging cause value.

Optionally, in some embodiments, the above communication unit may be a communication interface or a transceiver, or an input/output interface of a communication chip or a system-on-chip.

It can be appreciated that the network device 700 according to the embodiment of the present disclosure may correspond to the network device in the method embodiments of the present disclosure, and the above and other operations and/or functions of the respective units in the network device 700 are provided for the purpose of implementing the process flow corresponding to the network device in any of the method embodiments, and details thereof will be not omitted here for brevity.

FIG. 8 shows a schematic block diagram of a terminal device 800 according to an embodiment of the present disclosure. As shown in FIG. 8, the terminal device 800 includes:

a communication unit 810 configured to receive a paging message transmitted by a second access network device, the paging message including a first paging cause value.

Optionally, the first paging cause value may be an encrypted paging cause value or an unencrypted paging cause value.

Optionally, when the first paging cause value is an encrypted paging cause value, the terminal device may further include: a processing unit 820 configured to decrypt the first paging cause value using a decryption rule.

Optionally, the decryption rule may be pre-configured for the terminal device, or may be obtained by the terminal device via a Non-Access Stratum (NAS) process.

Optionally, in some embodiments, the above communication unit may be a communication interface or a transceiver, or an input/output interface of a communication chip or a system-on-chip. The above processing unit may be one or more processors.

It can be appreciated that the terminal device 800 according to the embodiment of the present disclosure may correspond to the terminal device in the method embodiments of the present disclosure, and the above and other operations and/or functions of the respective units in the terminal device 800 are provided for the purpose of implementing the process flow corresponding to the terminal device in any of the method embodiments, and details thereof will be not omitted here for brevity.

Figure 9:
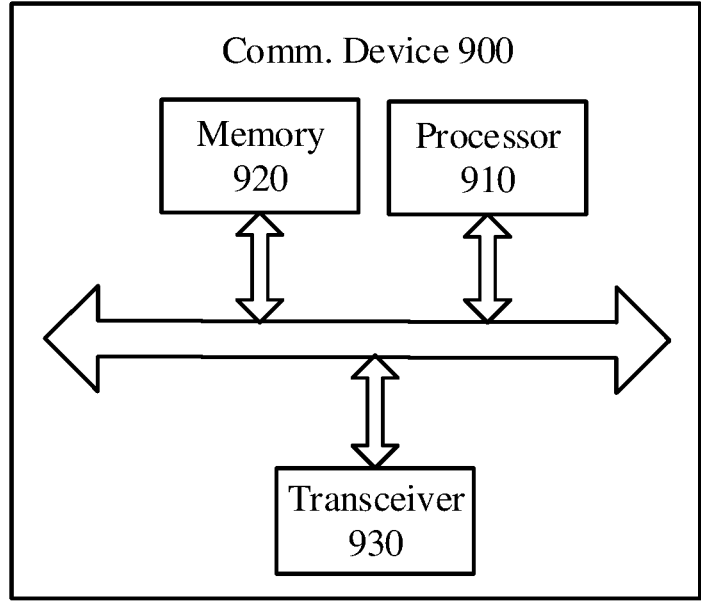
FIG. 9 is a schematic block diagram of a communication device 900 according to an embodiment of the present disclosure.

FIG. 9 is a schematic diagram showing a structure of a communication device 900 according to an embodiment of the present disclosure. The communication device 900 shown in FIG. 9 includes a processor 910, and the processor 910 can invoke and execute a computer program from a memory to implement the method in the embodiment of the present disclosure.

Optionally, as shown in FIG. 9, the communication device 900 may further include a memory 920. The processor 910 can invoke and execute a computer program from the memory 920 to implement the method in the embodiment of the present disclosure.

The memory 920 may be a separate device independent from the processor 910, or may be integrated in the processor 910.

Optionally, as shown in FIG. 9, the communication device 900 may further include a transceiver 930, and the processor 910 may control the transceiver 930 to communicate with other devices, and in particular, transmit information or data to other devices, or receive information or data transmitted by other devices.

Here, the transceiver 930 may include a transmitter and a receiver. The transceiver 930 may further include one or more antennas.

Optionally, the communication device 900 may specifically be the first access network device according to the embodiment of the present disclosure, and the communication device 900 may implement the corresponding processes implemented by the first access network device in any of the methods according to the embodiments of the present disclosure. For the sake of brevity, details thereof will be omitted here.

Optionally, the communication device 900 may specifically be the second access network device according to the embodiment of the present disclosure, and the communication device 900 may implement the corresponding processes implemented by the second access network device in any of the methods according to the embodiments of the present disclosure. For the sake of brevity, details thereof will be omitted here.

Optionally, the communication device 900 may specifically be the network device according to the embodiment of the present disclosure, and the communication device 900 may implement the corresponding processes implemented by the network device in any of the methods according to the embodiments of the present disclosure. For the sake of brevity, details thereof will be omitted here.

Optionally, the communication device 900 may specifically be the terminal device according to the embodiment of the present disclosure, and the communication device 900 may implement the corresponding processes implemented by the terminal device in any of the methods according to the embodiments of the present disclosure. For the sake of brevity, details thereof will be omitted here.

Figure 10:
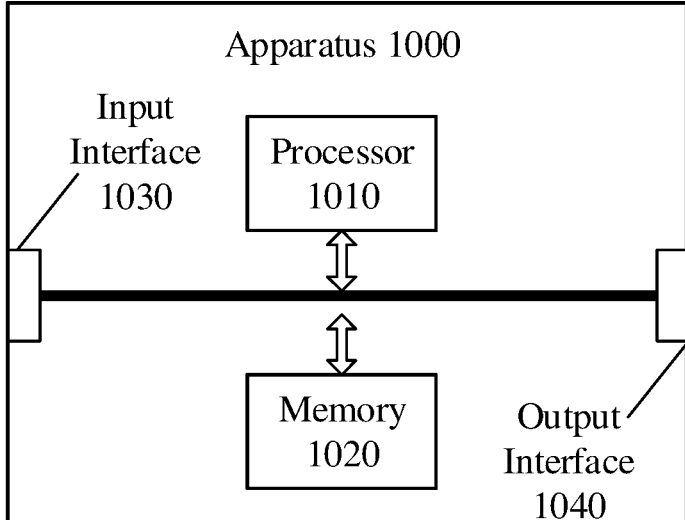
FIG. 10 is a schematic block diagram of an apparatus according to an embodiment of the present disclosure.

FIG. 10 is a schematic diagram showing a structure of an apparatus according to an embodiment of the present disclosure. The apparatus 1000 shown in FIG. 10 includes a processor 1010, and the processor 1010 can invoke and execute a computer program from a memory to implement the method in the embodiment of the present disclosure.

Optionally, as shown in FIG. 10, the apparatus 1000 may further include a memory 1020. The processor 1010 can invoke and execute a computer program from the memory 1020 to implement the method in the embodiment of the present disclosure.

The memory 1020 may be a separate device independent from the processor 1010, or may be integrated in the processor 1010.

Optionally, the apparatus 1000 may further include an input interface 1030. The processor 1010 can control the input interface 1030 to communicate with other devices or chips, and in particular, obtain information or data transmitted by other devices or chips.

Optionally, the apparatus 1000 may further include an output interface 1040. The processor 1010 can control the output interface 1040 to communicate with other devices or chips, and in particular, output information or data to other devices or chips.

Optionally, the apparatus can be applied to the first access network device in the embodiment of the present disclosure, and the apparatus can implement the corresponding processes implemented by the first access network device in the various methods of the embodiments of the present disclosure. For the sake of brevity, details thereof will be omitted here.

Optionally, the apparatus can be applied to the second access network device in the embodiment of the present disclosure, and the apparatus can implement the corresponding processes implemented by the second access network device in the various methods of the embodiments of the present disclosure. For the sake of brevity, details thereof will be omitted here.

Optionally, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

Optionally, the apparatus can be applied to the terminal device in the embodiment of the present disclosure, and the apparatus can implement the corresponding processes implemented by the terminal device in the various methods of the embodiments of the present disclosure. For the sake of brevity, details thereof will be omitted here.

Optionally, the apparatus in the embodiment of the present disclosure may be a chip, e.g., system-level chip, a system-chip, a chip system, or a system-on-chip.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The above processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device or base station in the embodiment of the present disclosure, and the computer program can cause a computer to perform corresponding procedures implemented by the network device or base station in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device or base station in the embodiment of the present disclosure, and the computer program instructions can cause a computer to perform corresponding procedures implemented by the network device or base station in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device or base station in the embodiment of the present disclosure. The computer program, when executed on a computer, can cause the computer to perform corresponding procedures implemented by the network device or base station in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The foregoing storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
transmitting, by a first access network device, a paging message to a second access network device, the paging message including a first paging cause value, wherein the method further comprises: prior to transmitting, by the first access network device, the paging message to the second access network device:
obtaining, by the first access network device, paging cause value assistance information from a network device, wherein
the paging cause value assistance information is used to assist the first access network device to determine the first paging cause value; and
the first access network device is an anchor access network device, the second access network device is an access network device in paging area configuration information configured for a terminal device, and the network device is a core network device.

2. The method according to claim 1, wherein the paging cause value assistance information comprises at least one of:
at least one paging cause value;
a Protocol Data Unit (PDU) session identifier associated with each paging cause value;
a Quality of Service (QoS) flow value associated with each paging cause value;
a slice identifier associated with each paging cause value; and
an encryption rule to be followed for a paging cause value to be encrypted.

3. The method according to claim 2, wherein:
a mapping relationship between paging cause values and PDU session identifiers is a one-to-one, one-to-multiple, or multiple-to-one mapping relationship;

a mapping relationship between paging cause values and QoS flow values is a one-to-one, one-to-multiple, or multiple-to-one mapping relationship; and/or a mapping relationship between paging cause values and slice identifiers is a one-to-one, one-to-multiple, or multiple-to-one mapping relationship.

4. The method according to claim 1, wherein said obtaining, by the first access network device, the paging cause value assistance information from the network device comprises:

receiving, by the first access network device, a first message transmitted by the core network device, the first message including the paging cause value assistance information.

5. The method according to claim 4, wherein the first message is a dedicated message for a specific terminal device, or is a common message not specific to any terminal device.

6. A wireless communication method, comprising:

receiving, by a terminal device, a paging message transmitted by a second access network device, the paging message including a first paging cause value, wherein the paging message is transmitted by a first access network device to the second access network device before the terminal device receives the paging message transmitted by the second access network device;

the first paging cause value is determined by the first access network device based on paging cause value assistance information;

the paging cause value assistance information is obtained by the first access network device from a network device before the paging message is transmitted by the first access network device to the second access network device; and the first access network device is an anchor access network device, the second access network device is an access network device in paging area configuration information configured for the terminal device, and the network device is a core network device.

7. A terminal device, comprising a processor and a memory, wherein the memory has a computer program stored thereon, and the processor is configured to invoke and execute the computer program stored in the memory to cause the terminal device to perform the method according to claim 6.

8. The terminal device according to claim 7, wherein the first paging cause value is an encrypted paging cause value or an unencrypted paging cause value.

9. The terminal device according to claim 7, wherein the paging cause value assistance information comprises at least one of:

at least one paging cause value;

a Protocol Data Unit (PDU) session identifier associated with each paging cause value;

a Quality of Service (QOS) flow value associated with each paging cause value;

a slice identifier associated with each paging cause value; and an encryption rule to be followed for a paging cause value to be encrypted.

10. The terminal device according to claim 9, wherein:

a mapping relationship between paging cause values and PDU session identifiers is a one-to-one, one-to-multiple, or multiple-to-one mapping relationship;

a mapping relationship between paging cause values and QoS flow values is a one-to-one, one-to-multiple, or multiple-to-one mapping relationship; and/or a mapping relationship between paging cause values and slice identifiers is a one-to-one, one-to-multiple, or multiple-to-one mapping relationship.

11. The terminal device according to claim 7, wherein the paging cause value assistance information is received by the first access network device from a first message transmitted by the core network device, the first message including the paging cause value assistance information.

12. The method according to claim 6, wherein the paging cause value assistance information comprises at least one of:

at least one paging cause value;

a Protocol Data Unit (PDU) session identifier associated with each paging cause value;

a Quality of Service (QOS) flow value associated with each paging cause value;

a slice identifier associated with each paging cause value; and an encryption rule to be followed for a paging cause value to be encrypted.

13. The method according to claim 12, wherein:

a mapping relationship between paging cause values and PDU session identifiers is a one-to-one, one-to-multiple, or multiple-to-one mapping relationship;

a mapping relationship between paging cause values and QoS flow values is a one-to-one, one-to-multiple, or multiple-to-one mapping relationship; and/or a mapping relationship between paging cause values and slice identifiers is a one-to-one, one-to-multiple, or multiple-to-one mapping relationship.

14. The method according to claim 6, wherein the paging cause value assistance information is received by the first access network device from a first message transmitted by the core network device, the first message including the paging cause value assistance information.

15. An access network device, the access network device being a first access network device and comprising a processor and a memory, wherein the memory has a computer program stored thereon, and the processor is configured to invoke and execute the computer program stored in the memory to cause the first access network device to perform:

transmitting a paging message to a second access network device, the paging message including a first paging cause value;

wherein prior to transmitting the paging message to the second access network device, the processor is configured to invoke and execute the computer program stored in the memory to cause the first access network device to further perform:

obtaining paging cause value assistance information from a network device, wherein the paging cause value assistance information is used to assist the first access network device to determine the first paging cause value; and the first access network device is an anchor access network device, the second access network device is an access network device in paging area configuration information configured for a terminal device, and the network device is a core network device.

16. The access network device according to claim 15, wherein the paging cause value assistance information comprises at least one of:

at least one paging cause value;

a Protocol Data Unit (PDU) session identifier associated with each paging cause value;

a Quality of Service (QoS) flow value associated with each paging cause value;

a slice identifier associated with each paging cause value; and an encryption rule to be followed for a paging cause value to be encrypted.

17. The access network device according to claim 16, wherein:

a mapping relationship between paging cause values and PDU session identifiers is a one-to-one, one-to-multiple, or multiple-to-one mapping relationship;

a mapping relationship between paging cause values and QoS flow values is a one-to-one, one-to-multiple, or multiple-to-one mapping relationship; and/or a mapping relationship between paging cause values and slice identifiers is a one-to-one, one-to-multiple, or multiple-to-one mapping relationship.

18. The access network device according to claim 15, wherein said obtaining the paging cause value assistance information from the network device comprises:

receiving a first message transmitted by the core network device, the first message including the paging cause value assistance information.

19. The access network device according to claim 18, wherein the first message is a dedicated message for a specific terminal device, or is a common message not specific to any terminal device.

20. The method according to claim 15, wherein the first paging cause value is an encrypted paging cause value or an unencrypted paging cause value.

* * * * *